US012296211B2

(12) United States Patent
Kronebusch et al.

(10) Patent No.: US 12,296,211 B2
(45) Date of Patent: May 13, 2025

(54) FIRE EXTINGUISHER MANIFOLD

(71) Applicant: Kronebusch Industries, LLC, Rochester, MN (US)

(72) Inventors: Allen R. Kronebusch, Oronoco, MN (US); Lisa M. Anderson, Owatonna, MN (US)

(73) Assignee: Kronebusch Industries, LLC, Rochester, MN (US)

(*) Notice: Subject to any disclaimer, the term of this patent is extended or adjusted under 35 U.S.C. 154(b) by 549 days.

(21) Appl. No.: 17/138,244

(22) Filed: Dec. 30, 2020

(65) Prior Publication Data

US 2022/0203147 A1 Jun. 30, 2022

(51) Int. Cl.
*A62C 35/13* (2006.01)
*A62C 35/68* (2006.01)

(52) U.S. Cl.
CPC .............. *A62C 35/13* (2013.01); *A62C 35/68* (2013.01)

(58) Field of Classification Search
CPC ................................ A62C 35/68; A62C 35/13
USPC .......................................................... 169/16
See application file for complete search history.

(56) References Cited

U.S. PATENT DOCUMENTS

| | | | | | |
|---|---|---|---|---|---|
| 2,492,165 | A * | 12/1949 | Mapes | A62C 99/0027 | 137/500 |
| 2,611,577 | A * | 9/1952 | Grant, Jr. | F16K 31/105 | 137/625.45 |
| 2,619,109 | A * | 11/1952 | Garrett | F16K 17/10 | 137/488 |
| 2,661,017 | A * | 12/1953 | Geiger | F16K 27/04 | 137/269 |
| 2,758,811 | A * | 8/1956 | Peterson | F16K 31/363 | 251/38 |
| 3,860,073 | A * | 1/1975 | Willms | F16K 31/383 | 251/43 |
| 4,967,934 | A * | 11/1990 | Andonian | F17C 13/04 | 137/382.5 |
| 5,628,489 | A * | 5/1997 | Woodman | A62C 35/68 | 251/29 |
| 6,708,719 | B2 * | 3/2004 | Idoguchi | F17C 13/084 | 222/135 |
| 2019/0076686 | A1 | 3/2019 | Kronebusch et al. | | |

* cited by examiner

*Primary Examiner* — Chee-Chong Lee
(74) *Attorney, Agent, or Firm* — Merchant & Gould P.C.

(57) ABSTRACT

A manifold includes a main body and a plurality of fire-extinguishing container receptacles defined in the main body, each being configured to receive a fire-extinguishing agent container. The manifold includes a plurality of valves in communication with the plurality of fire-extinguishing container receptacles. The plurality of valves each are connected to an auxiliary fluid passage. The manifold includes a main fluid passage defined in the main body. The main fluid passage is connected to each auxiliary fluid passage. The manifold includes a dispensing outlet at the end of the main fluid passage. The dispensing outlet is configured to be fluidically coupled with a dispensing mechanism.

27 Claims, 15 Drawing Sheets

FIRE EXTINGUISHER MANIFOLD

BACKGROUND

Fire extinguishers are sometimes used to extinguish or control small fires in emergencies. A fire extinguisher typically includes a cylindrical pressure vessel containing an agent in a pressurized state. The agent can be discharged from the vessel and into the fire to extinguish the fire. Fire extinguishers are often handheld devices sized to be handled by a user.

Automatic fire-extinguishing systems are known; however, such systems typically do not use handheld fire extinguishers due to their size and inability to store a sufficient amount of fire-extinguishing agent. Thus, such systems require the use of a specialized vessel to store a sufficient amount of fire-extinguishing agent. These specialized vessels are costly, difficult to refill, and require a substantial amount square footage to accommodate.

SUMMARY

In general terms, this disclosure is directed to a fire extinguisher manifold. In one possible configuration and by non-limiting example, this disclosure relates to a fire extinguisher system that utilizes a manifold to combine the fire-extinguishing agent contained in a plurality of fire extinguishers for dispersion at a dispersion zone. Various aspects are described in this disclosure, which include, but are not limited to, the following aspects.

In one example of the present disclosure, a manifold for a fire-extinguishing apparatus is disclosed. The manifold includes a main body and a plurality of fire-extinguishing container receptacles defined in the main body, each being configured to receive a fire-extinguishing agent container. The manifold includes a plurality of valves in communication with the plurality of fire-extinguishing container receptacles. The plurality of valves each are connected to an auxiliary fluid passage. The manifold includes a main fluid passage defined in the main body. The main fluid passage is connected to each auxiliary fluid passage. The manifold includes a dispensing outlet at the end of the main fluid passage. The dispensing outlet is configured to be fluidically coupled with a dispensing mechanism.

In another example of the present disclosure, a manifold for a fire-extinguishing apparatus is disclosed. The manifold includes a first portion of a main body. The first portion includes a plurality of fire-extinguishing container receptacles each being configured to receive a fire extinguishing agent container. The manifold includes a second portion of the main body, that includes a plurality of valves each being configured to mate with a respective fire-extinguishing agent container positioned in each of the plurality of fire-extinguishing container receptacles. The second portion includes a main fluid passage that is connected to each valve via an auxiliary fluid passage defined at least partially in the second portion. The second portion includes a first outlet at a first end of the main fluid passage that is configured to be fluidically coupled with a dispensing mechanism. The second portion includes a second outlet at a second end of the main fluid passage. The second outlet is configured for connection with a pressure valve.

In another example of the present disclosure, a fire-extinguishing system is disclosed. The fire-extinguishing system includes a plurality of fire-extinguishing agent containers positioned within at least one fire-extinguishing container receptacle defined in a main body. The fire-extinguishing system includes a plurality of valves each being connected to one of the plurality of fire-extinguishing agent containers and the main body. The fire-extinguishing system includes a main fluid passage defined in the main body. The main fluid passage is fluidically coupled to each valve. The fire-extinguishing system includes a dispensing outlet at a first end of the main fluid passage, the dispensing outlet being configured to be mated with a dispensing mechanism.

Corresponding reference characters indicate corresponding parts throughout the several views. The exemplifications set out herein illustrate an embodiment of the invention, and such exemplifications are not to be construed as limiting the scope of the invention in any manner.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
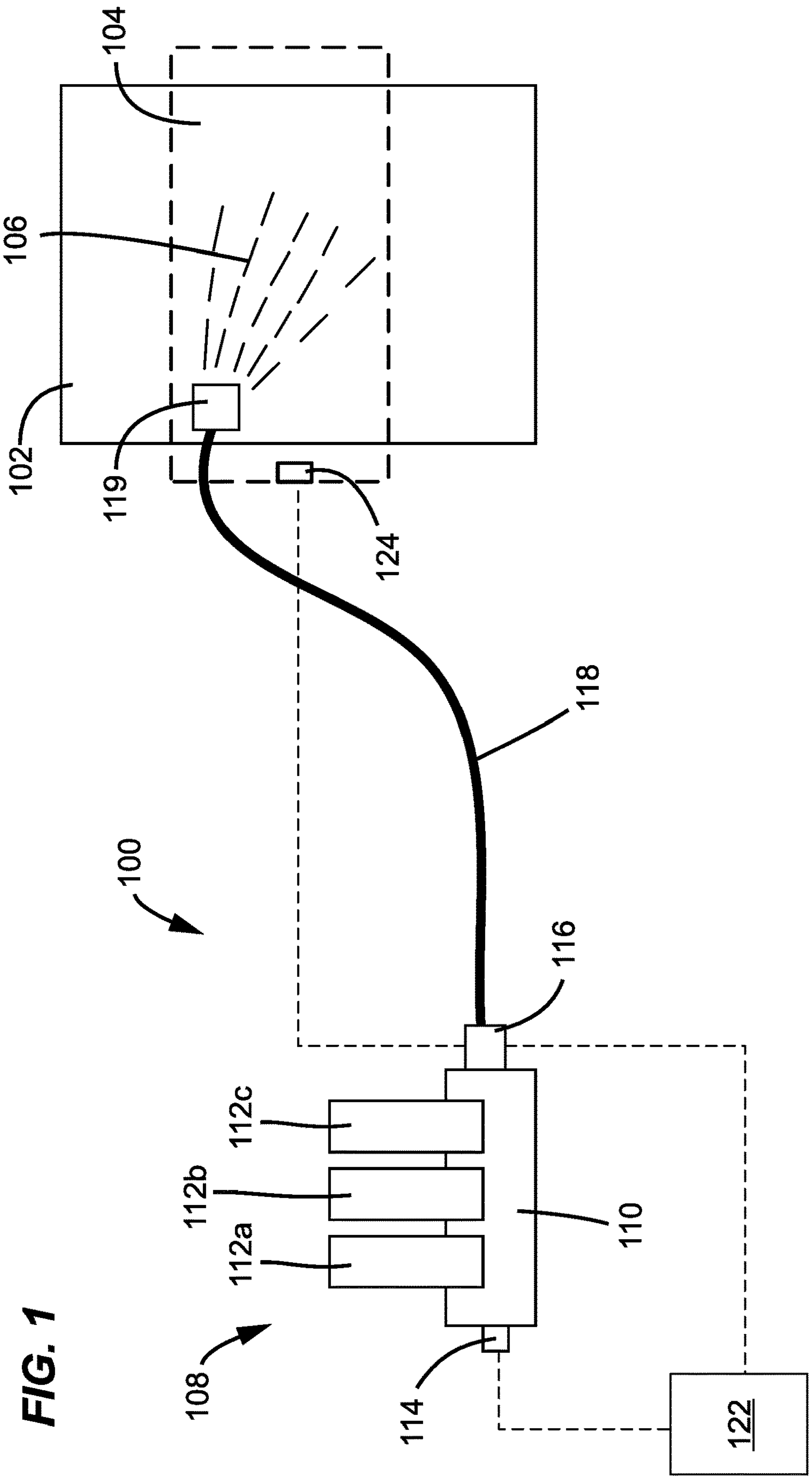
FIG. 1 is a schematic view of a fire suppression system, according to the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The fire-extinguishing agent container manifold disclosed herein has a variety of advantages. The manifold combines the fire-extinguishing agent contained in a plurality of fire-extinguishing agent containers connected to manifold and outputs the fire-extinguishing agent via a single output for a fire suppression system. Because the manifold is sized and shaped to receive fire-extinguishing agent containers of a reasonable size, the user need not invest in a specialty container to hold the fire-extinguishing agent for the fire suppression system. Further, in the event that more fire-extinguishing agent is needed, the user can simply replace a fire-extinguishing agent container(s) within the manifold. The manifold can be sized to hold any number of fire-extinguishing agent containers, depending on the application. Further, the configuration of the manifold allows the user to easily position the manifold and associated containers in a convenient location without have to sacrifice precious square footage.

An example of a fire-extinguishing agent system is disclosed in U.S. application Ser. No. 15/914,724, which is hereby incorporated in its entirety.

FIG. 1 shows an example environment having a fire suppression system 100. A work area 102, such as a particular portion in a machine (e.g., a cotton gin) or a portion of a manufacturing environment, is shown. A fire suppression zone 104 within the work area 102 is protected from fire via a fire-extinguishing agent 106 dispensed from a fire-extinguishing apparatus 108. In some examples, the fire-extinguishing apparatus 108 is configured to automatically dispense the fire-extinguishing agent 106 in the event of a sensed fire. In some examples, the fire-extinguishing apparatus 108 is configured to manually dispense the fire-extinguishing agent 106 in the event of a sensed fire.

The fire suppression system 100 can have a variety of different applications. For example, it can be used to extinguish a fire that can break out in an engine compartment of vehicles or machinery.

A variety of different extinguishing agents can be used as fire-extinguishing agent 106, such as, water, wet chemical, and clean agents. For example, different agents are used for different classes of fires, such as fires on ordinary combustibles including wood, cloth, paper, and plastics; fires on flammable liquids including gasoline, oil, grease, and tar; or fires on energized electrical equipment including wiring, fuse boxes, circuit breakers, and machinery. These and other agents can be used in various possible embodiments.

The fire-extinguishing apparatus 108 includes a manifold 110, a plurality of fire-extinguishing agent containers 112*a*, 112*b*, 112*c*, a pressure gauge 114, a control valve 116, a dispensing conduit 118, and a dispensing apparatus 120. In some examples, the fire-extinguishing apparatus 108 includes a controller 122 in communication with the pressure gauge 114, the control valve 116, and/or the fire suppression zone 104.

The fire-extinguishing apparatus 108 is configured to dispense the fire-extinguishing agent 106 contained within the fire-extinguishing agent containers 112*a*, 112*b*, 112*c* via the manifold 110. The manifold 110 is configured to output fire-extinguishing agent 106 via the dispensing conduit 118 to the dispensing apparatus 120 positioned at the fire suppression zone 104. In some examples, the fire-extinguishing agent 106 is expelled from a nozzle 119 of the dispensing apparatus 120 at the fire suppression zone 104. In some examples, multiple manifolds 110 can be used. In some examples, multiple manifolds are configured to dispense the fire-extinguishing agent to the same fire suppression zone. In some examples, multiple manifolds are configured to dispense the fire-extinguishing agent via the same dispensing conduit 118. In some examples, multiple manifolds are configured to dispense the fire-extinguishing agent via the different dispensing conduits to the same fire suppression zone.

The manifold 110 is connected to one end of the dispensing conduit 118. For example, the one end of the dispensing conduit 118 can be made with a stainless steel connector that is connected to the manifold 110 by thread joint. The other end of the dispensing conduit 118 is arranged at the fire suppression zone 104. The dispensing conduit 118 can have various lengths according to the distance between a place where the fire-extinguishing apparatus 108 is installed and the fire suppression zone 104.

The other end of the dispensing conduit 118 is sealed with the nozzle 119. In some examples, the other end of the dispensing conduit 118 is made with a stainless steel connector that is connected with a temperature responsive element by thread joint. The temperature responsive element breaks and permits the fire-extinguishing agent to flow out at or above a predetermined temperature.

In some examples, the controller 122 can use either wired or wireless communication to communicate with the control valve 116, the pressure gauge 114, and/or the fire suppression zone 104 (e.g., via sensor). In some examples, the controller 122 can be connected to a detection mechanism 124 and within the fire suppression zone 104, remote from the manifold 110 and the plurality of fire-extinguishing agent containers 112*a*, 112*b*, 112*c*.

The detection mechanism 124 operates to automatically detect the presence of a fire. In one example, the detection mechanism 124 is configured to respond to a predetermined temperature in the fire suppression zone 104. In some examples, the control valve 116 is connected to the detection mechanism 124 to automatically open and discharge the fire-extinguishing agent 106 upon the detection of the presence of a fire by the detection mechanism 124.

In some examples, the detection mechanism 124 is configured to detect the presence of a fire by measuring a temperature within the fire suppression zone 104. In some examples, the detection mechanism 124 is a mechanical fusible link, which includes two metal pieces soldered with a fusible alloy that is designed to melt at a predetermined temperature. A variety of fusible links can be used, such as including two opposing apertures with a fusible alloy therebetween. Suitable fusible links are available from Globe Technologies Corporation in Standish, Michigan.

Figure 2:
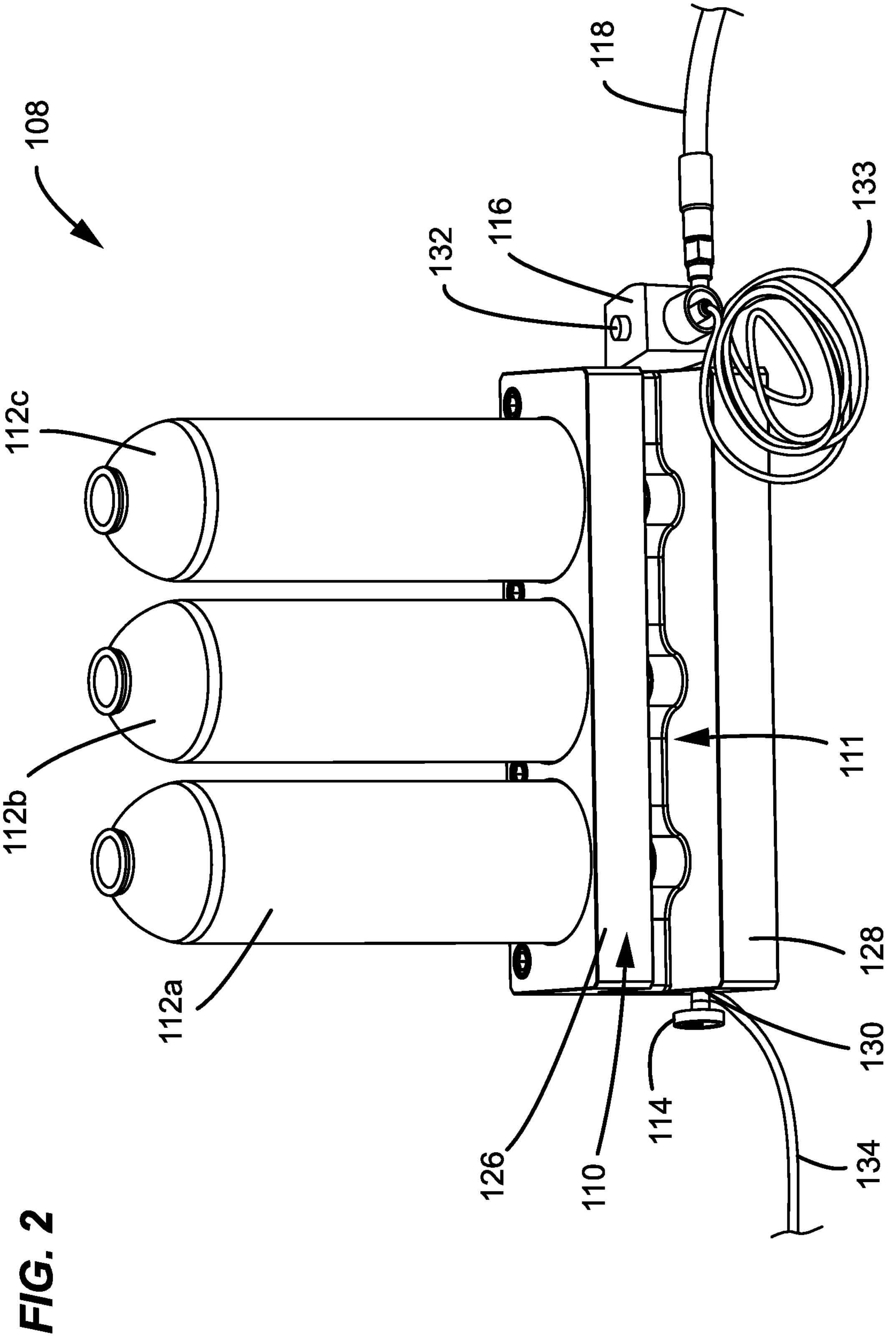
FIG. 2 is a perspective view of a fire-extinguishing apparatus, according to the principles of the present disclosure.

FIG. 2 shows a perspective view of the fire-extinguishing apparatus 108 with the pressure gauge 114 and control valve 116 attached to the manifold 110. Three fire-extinguishing agent containers 112*a*, 112*b*, 112*c* are shown positioned within the manifold 110. However, it is considered within the scope of the present disclosure that any number equal to or greater than two fire-extinguishing agent containers can be utilized.

Further, the manifold 110 is shown to include a first portion 126 and a second portion 128. In some examples, the first portion is separable from the second portion 128. In some examples, the first and second portions 126, 128 form a unitary monolithic body. In the depicted example, the pressure gauge 114 and control valve 116 are connected to the second portion 128 of the manifold 110, and the fire-extinguishing agent containers 112*a*, 112*b*, 112*c* are held within the first portion 126 of the manifold 110. In some examples, a recess 111 is defined between a portion of the first and second portions 126, 128. The recess 111 is configured to give the user access to portions of the manifold 110.

In some examples, the fire-extinguishing agent containers 112*a*, 112*b*, 112*c* are aerosol containers. Each aerosol containers can includes a top that is crimped about its edges to form a permanent seal that prevents the fire-extinguishing agent from leaking from the fire-extinguishing agent containers. The construction of the containers 112*a*, 112*b*, 112*c* prevents leaking and allows the fire suppression system 100 to last for a very long time without requiring frequent servicing, unlike traditional fire extinguishers that typically require annual servicing and have limited shelf lives.

The pressure gauge 114 is connected to a gauge port 130 of the second portion 128 of the manifold 110. Accordingly, the pressure gauge 114 is configured for measuring the pressure of an agent within passageways defined in the manifold 110. In some examples, the pressure gauge 114 can be connected to the gauge port 130 via a conduit and positioned remotely from the manifold 110. In some examples, the pressure gauge 114 can notify the user (i.e., via an alarm) when the pressure is at a certain threshold (e.g., to low). This notification can indicate that the apparatus 108 is dispensing fire-extinguishing agent to suppress a fire, a malfunction in the apparatus 108, and/or when the fire-extinguishing agent levels are too low and the fire-extinguishing agent containers need to be replaced. In some examples, the pressure gauge 114 is configured to trigger an alarm if pressure within the manifold 110 drops to 45 psi or lower.

The control valve 116 controls when fire-extinguishing agent 106 is dispensed from the manifold 110 to the dispensing conduit 118. In some examples, the control valve 116 is connected to the controller 122 and the controller 122 automatically actuates the control valve 116 when it is determined, via the detection mechanism 124 for example, that a fire needs to be suppressed. In some examples, the control valve 116 includes a manual control element 132, so that the control valve 116 can be manually actuated by actuation of the manual control element 132. It some examples, the control valve 116 is connected via a wire 133 for remote control. In some examples, the control valve 116 is remotely controllable manually. In some examples, the control valve 116 can be remotely controlled wirelessly. In some examples, the control valve 116 is a normally closed solenoid valve. In some examples, the control valve 116 is a red hat solenoid valve.

In some examples, the pressure gauge 114 and/or control valve 116 are connected to the controller 122 via communication lines 134. In some examples, the controller 122 is configured to use readings from the pressure gauge 114 to control the operation of the control valve 116. In some examples, the fire-extinguishing apparatus 108 can include additional sensors such as, but not limited to, a flow sensor, additional pressure sensors, a temperature sensor, etc. In some examples, the controller 122 is configured to use data from any of a variety of sensors, either on the fire-extinguishing apparatus 108 or remote therefrom, to control the operation of the control valve 116.

Figure 3:
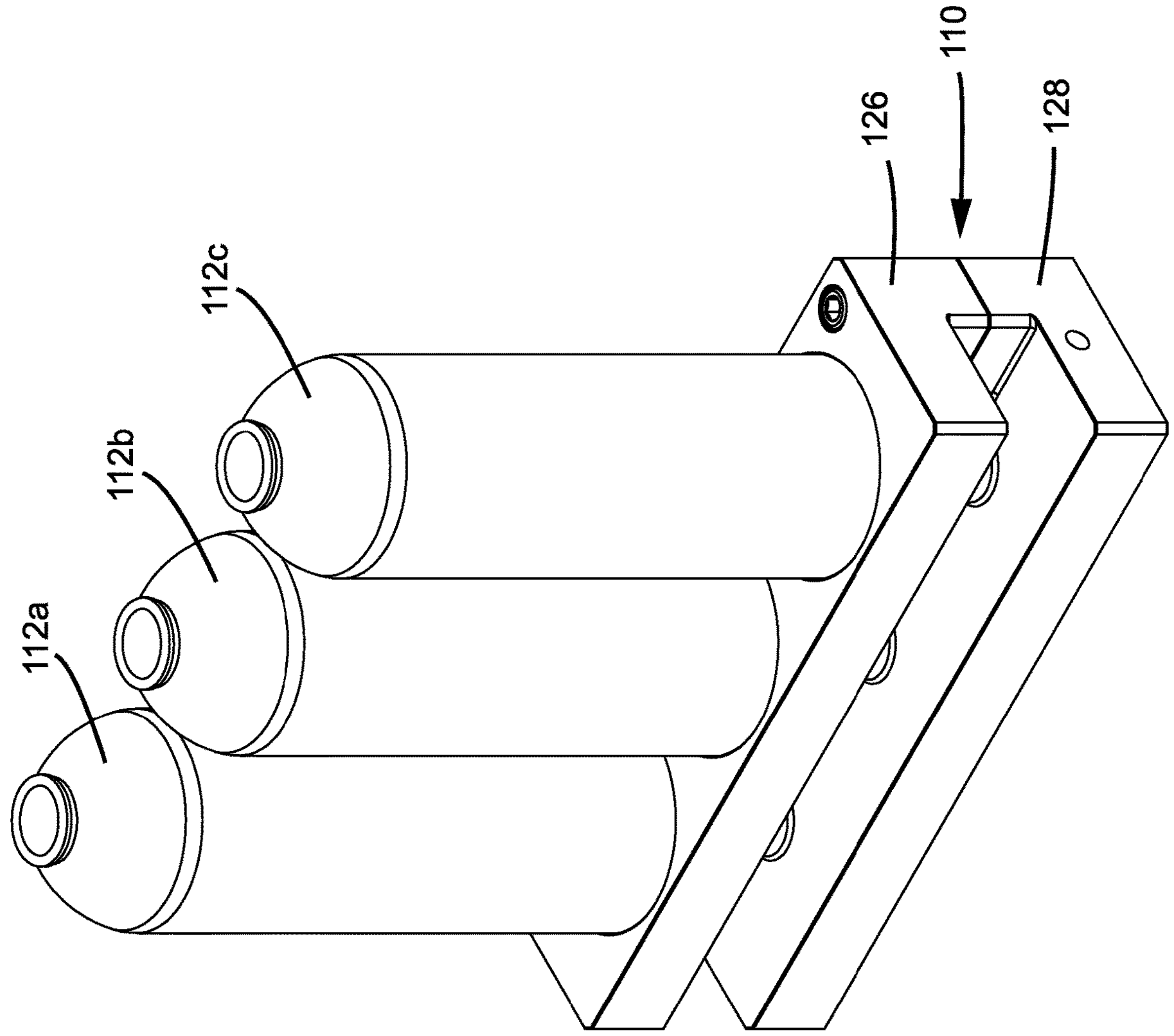
FIG. 3 is another perspective view of the fire-extinguishing apparatus of FIG. 2.
Figure 4:
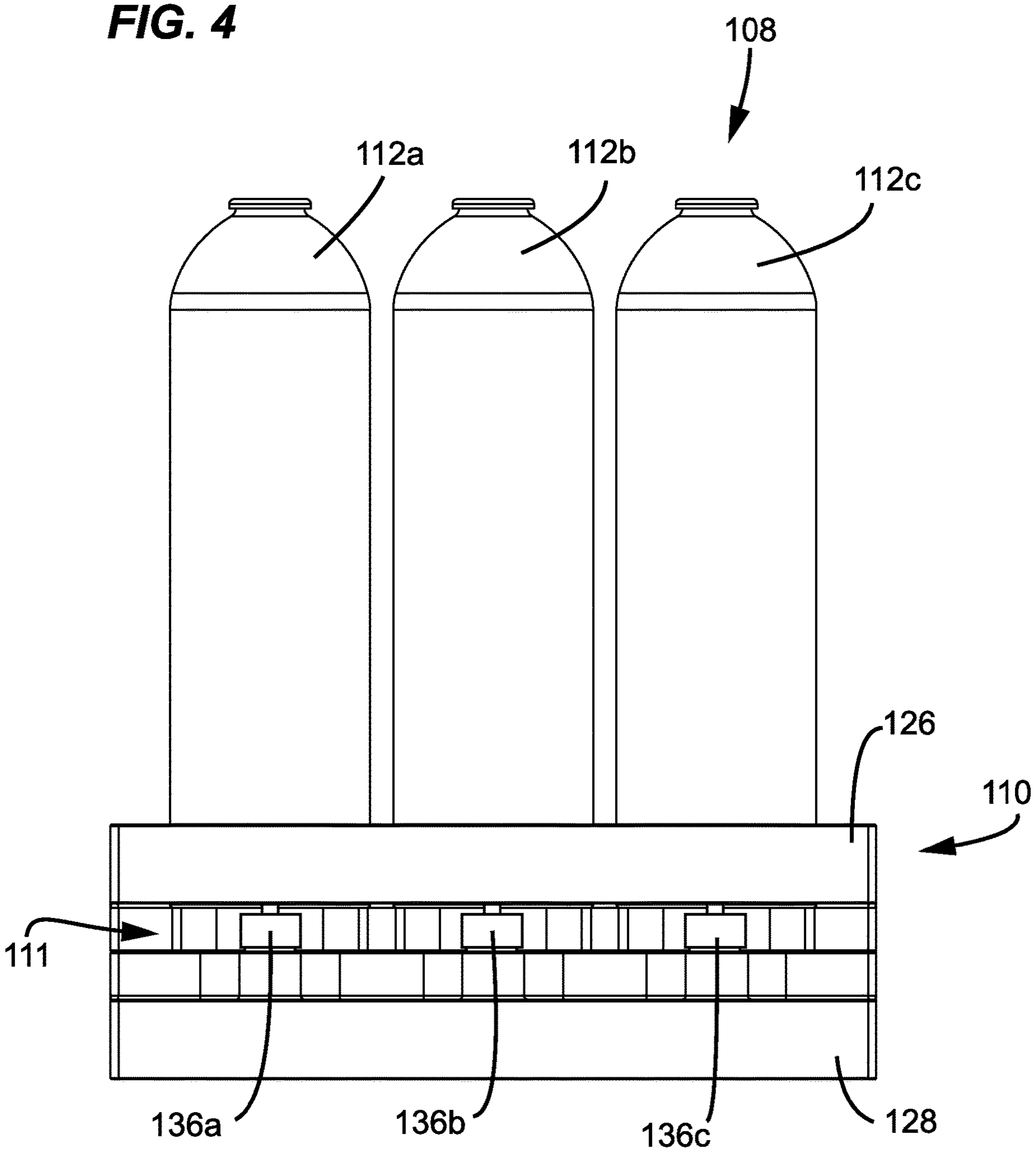
FIG. 4 is front view of the fire-extinguishing apparatus of FIG. 3.

FIG. 3 shows a perspective view of the fire-extinguishing apparatus 108 with the pressure gauge 114, control valve 116, and dispensing conduit 118 removed from the manifold 110. FIG. 4 shows a front view of the fire-extinguishing apparatus 108 showing a plurality of valves 136*a*, 136*b*, 136*c* connected to the second portion 128.

The recess 111 of the manifold 110 gives access to the plurality of valves 136*a*, 136*b*, 136*c*. In some examples, the recess 111 allows the user to easily perform maintenance on the valves 136*a*, 136*b*, 136*c* without having to separate the first and second portions 126, 128 from each other.

The valves 136*a*, 136*b*, 136*c* are configured to be connected to the fire-extinguishing agent containers 112*a*, 112*b*, 112*c* so that fire-extinguishing agent contained within the fire-extinguishing agent containers 112*a*, 112*b*, 112*c* can be transferred to internal passageways within the manifold 110. Once fluid is in the manifold 110, it is further transferred to the dispensing conduit 118 when the control valve 116 is in an open position.

The fire-extinguishing agent containers 112*a*, 112*b*, 112*c* contain agent under pressure. Because of this, the valves 136*a*, 136*b*, 136*c* are configured to form a seal with the fire-extinguishing agent containers 112*a*, 112*b*, 112*c* that can withstand the pressure. In some examples, the valves 136*a*, 136*b*, 136*c* are quick connect valves and configured to quickly connect to each of the fire-extinguishing agent containers 112*a*, 112*b*, 112*c* in the event that the fire-extinguishing agent containers 112*a*, 112*b*, 112*c* need to be replaced. In some examples, each of the valves 136*a*, 136*b*, 136*c* are threaded into the manifold 110, specifically the second portion 128, and mated with each fire-extinguishing agent container 112*a*, 112*b*, 112*c*. In some examples, the fire-extinguishing agent containers 112*a*, 112*b*, 112*c* each include a male portion that is received by a female portion of each of the valves 136*a*, 136*b*, 136*c*. In some examples, the fire-extinguishing agent containers 112*a*, 112*b*, 112*c* each include a female portion that receives a male portion of each of the valves 136*a*, 136*b*, 136*c*.

Figure 5:
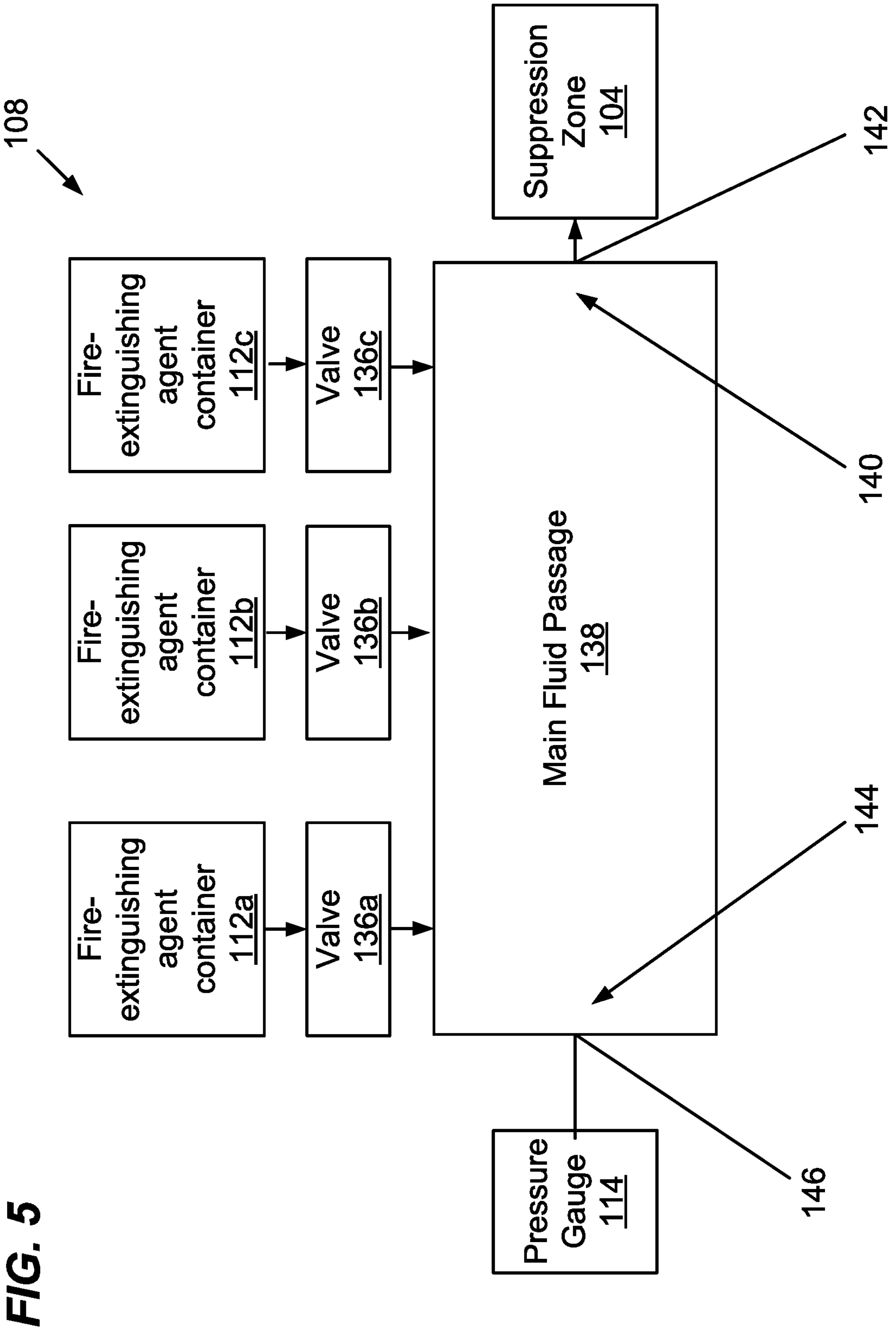
FIG. 5 is an operational schematic of the fire-extinguishing apparatus of FIG. 3.

FIG. 5 shows an operating schematic of the fire-extinguishing apparatus 108. Each fire-extinguishing agent container 112*a*, 112*b*, 112*c* via each one of the valves 136*a*, 136*b*, 136*c* is fluidically connected to a main fluid passage 138. Fire-extinguishing agent 106 is combined in the main fluid passage 138 that has a first end 140 with a dispensing outlet 142 and a second end 144 with a pressure outlet 146. The dispensing outlet 142 is configured to direct the fire-extinguishing agent within the main fluid passage 138 to the fire suppression zone 104. The pressure outlet 146 is configured to connect to the pressure gauge 114. In some examples, fire-extinguishing agent is prevented from leaving the second end 144 of the main fluid passage 138 by the pressure gauge 114. In some examples, a dispensing conduit is connected to the pressure outlet 146, leading to a remote pressure gauge. In some examples, as mentioned above, the fire-extinguishing apparatus 108 can have more than three fire-extinguishing agent containers and associated valves connecting to the main fluid passage 138.

Figure 6:
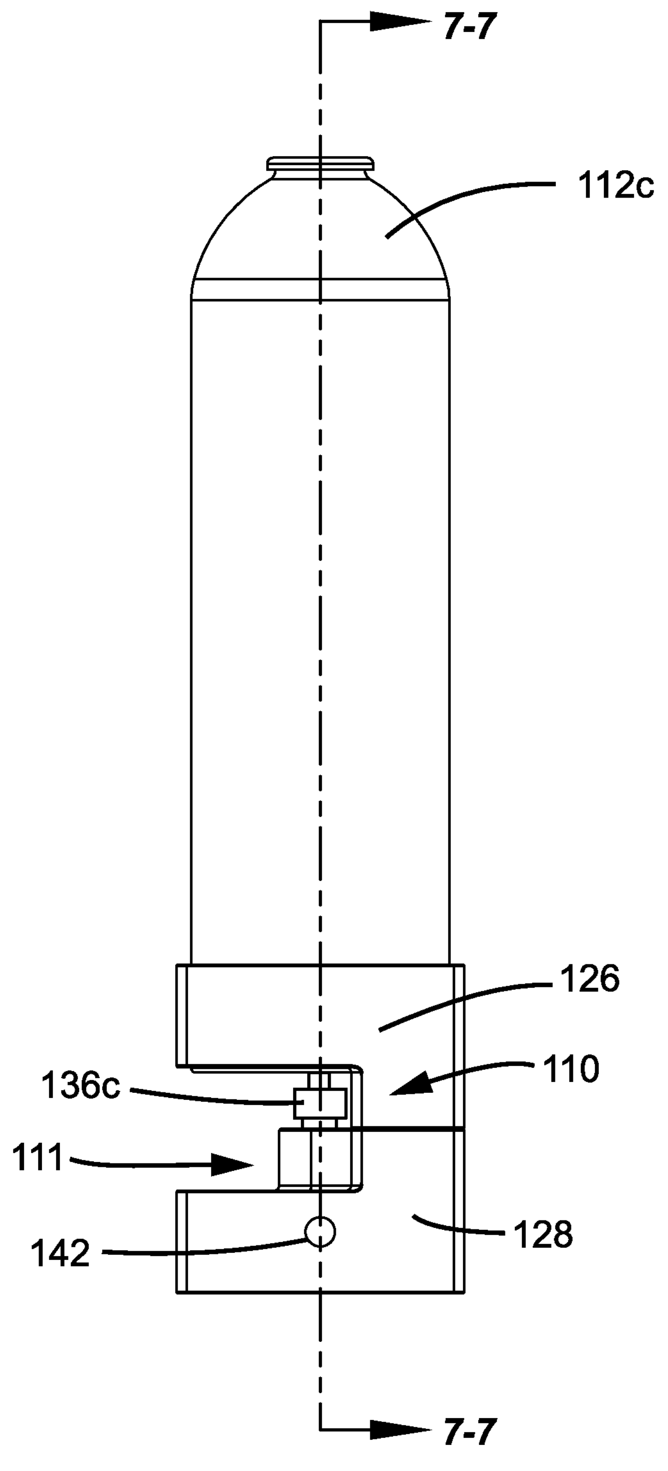
FIG. 6 is side view of the fire-extinguishing apparatus of FIG. 3.

FIG. 6 shows a side view of the fire-extinguishing apparatus 108. As shown, the first and second portions 126, 128 have an L-shaped cross section. The second portion 128 includes the dispensing outlet 142 defined in a side.

Figure 7:
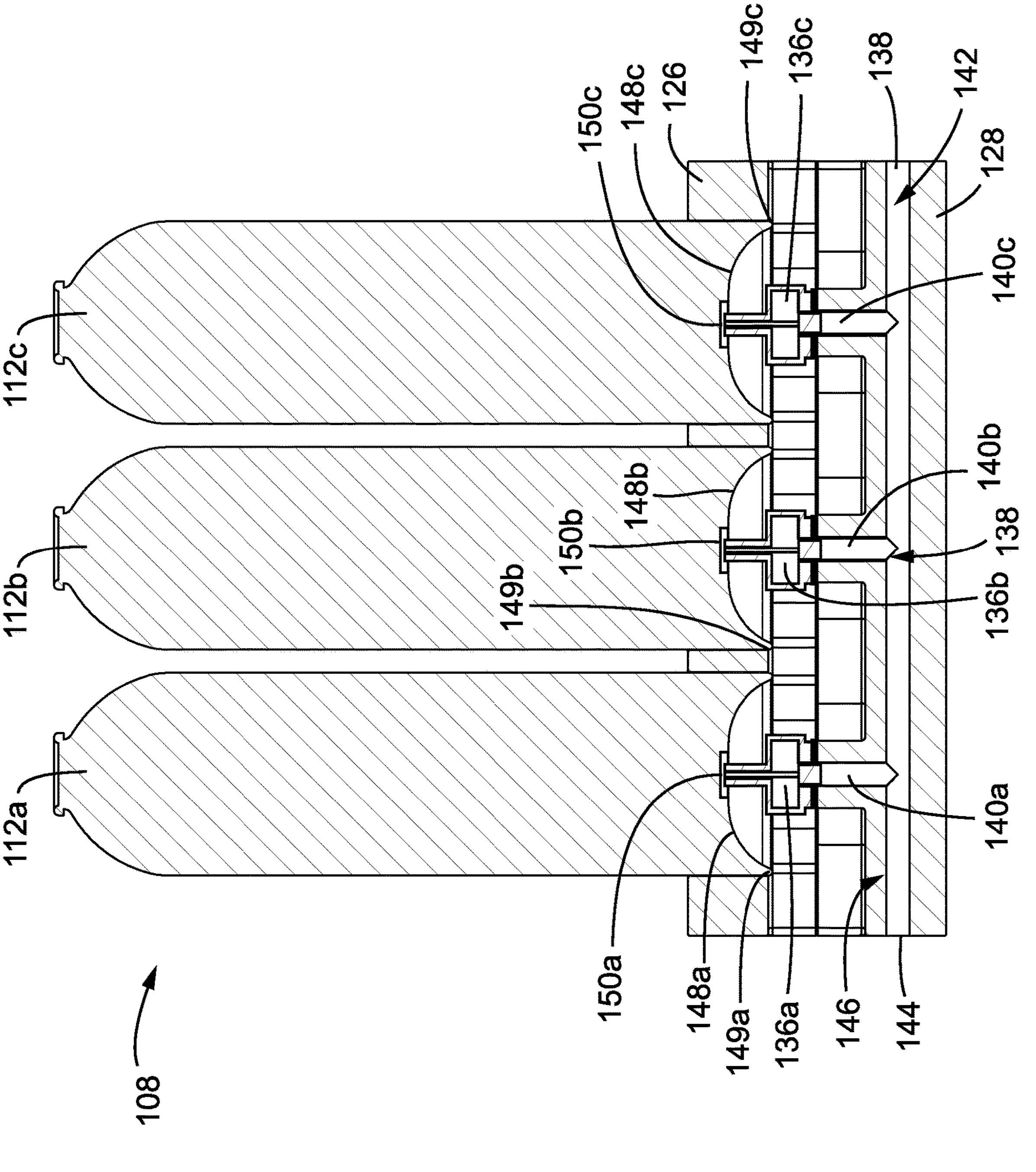
FIG. 7 is cross-sectional view along line 7-7 of the fire-extinguishing apparatus of FIG. 6.

FIG. 7 shows a cross section of the fire-extinguishing apparatus 108 about line 7-7 of FIG. 6. As shown, three auxiliary fluid passages 140*a*, 140*b*, 140*c* lead from each valve 136*a*, 136*b*, 136*c* to the main fluid passage 138.

Accordingly, fire-extinguishing agent within the fire-extinguishing agent containers 112*a*, 112*b*, 112*c* is removed from the fire-extinguishing agent containers 112*a*, 112*b*, 112*c* via the valves 136*a*, 136*b*, 136*c* and travels through the auxiliary fluid passages 140*a*, 140*b*, 140*c* to the main fluid passage 138.

In some examples, the fire-extinguishing agent containers 112*a*, 112*b*, 112*c* can have recessed bottom surfaces 148*a*, 148*b*, 148*c* with bottom rims 149*a*, 149*b*, 149*c*. Each fire-extinguishing agent container 112*a*, 112*b*, 112*c* contains a port 150*a*, 150*b*, 150*c*. The ports 150*a*, 150*b*, 150*c* are configured to mate with the valves 136*a*, 136*b*, 136*c* to connect the fire-extinguishing agent containers 112*a*, 112*b*, 112*c* to the manifold 110. In some examples, the ports 150*a*, 150*b*, 150*c* are cylindrically shaped. In some examples, the ports 150*a*, 150*b*, 150*c* are threaded on an outer surface. In some examples, the ports 150*a*, 150*b*, 150*c* are configured for quick connection with the valves 136*a*, 136*b*, 136*c* of the manifold 110.

Figure 8:
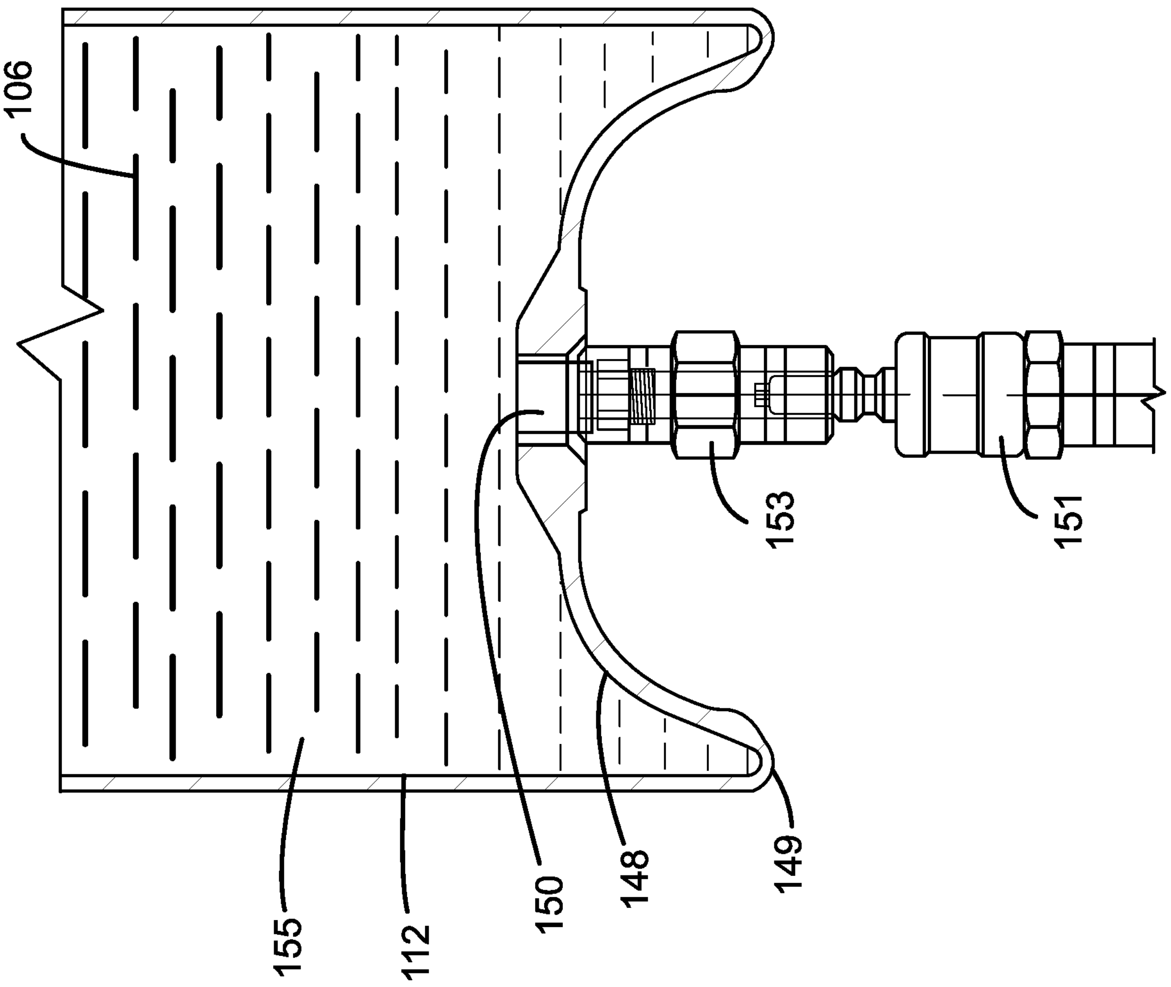
FIG. 8 is a schematic of a fire-extinguishing agent container and a valve of the fire-extinguishing apparatus of FIG. 3.

FIG. 8 shows a schematic view of one of the valves 136*a*, 136*b*, 136*c* and a single fire-extinguishing agent container 112 in a schematic mating relationship. As shown, the valve 136 includes a male portion 151 and a corresponding female portion 153. In the depicted example, the female portion 153 is connected to the port 150 within the recessed bottom surface 148 of the fire-extinguishing agent container 112. The female portion 153 receives the male portion 151 and forms a sealed connection. Once the female and male portions 153, 151 are mated, fire-extinguishing agent 106 can flow from inside 155 the fire-extinguishing agent container 112, through the port 150, through the female portion 153, and into the male portion 151 to be transferred into the manifold 110.

While the valve that is shown is always open, valves that have a selectable open/closed position can also be used. In such an example, the valve can be connected to the controller 122 and be selectively opened to dispense fire-extinguishing agent from the fire-extinguishing agent container 112. In such an example, a separate control valve 116 attached to the manifold 110 can be eliminated.

Figure 9:
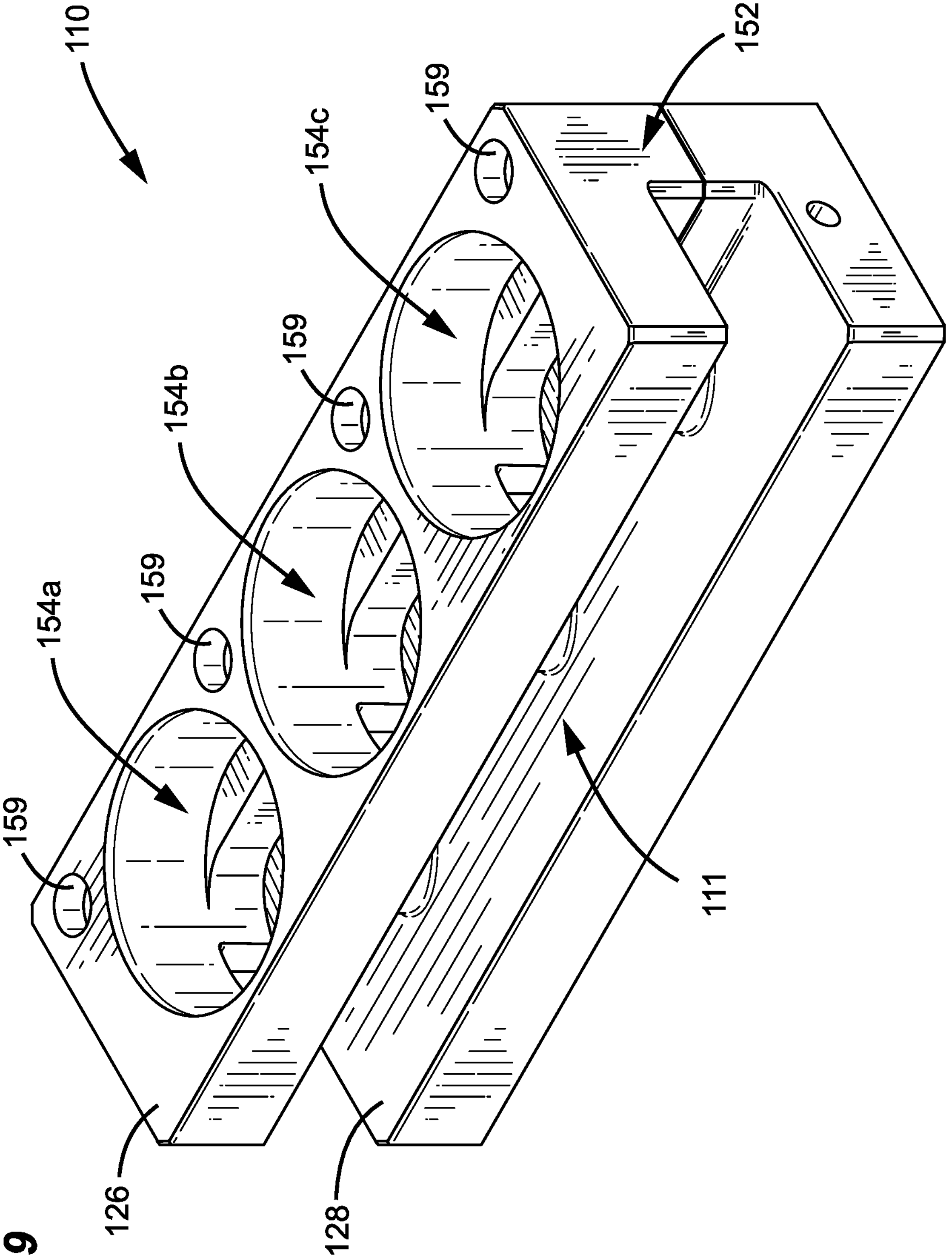
FIG. 9 is a perspective view of a manifold of fire-extinguishing apparatus of FIG. 3.

FIG. 9 shows a perspective view of the manifold 110 with fire-extinguishing agent containers 112*a*, 112*b*, 112*c* positioned therein. The manifold 110 includes a main body 152 that includes the first and second portions 126, 128. Three fire-extinguishing container receptacles 154*a*, 154*b*, 154*c* are defined on the main body 152, specifically the first portion 126. In the depicted example, a plurality of fastener apertures 159 are defined in the first portion 126. The fastener apertures 159 are configured to receive fasteners to secure the first and second portions 126, 128 together with one another.

Figure 10:
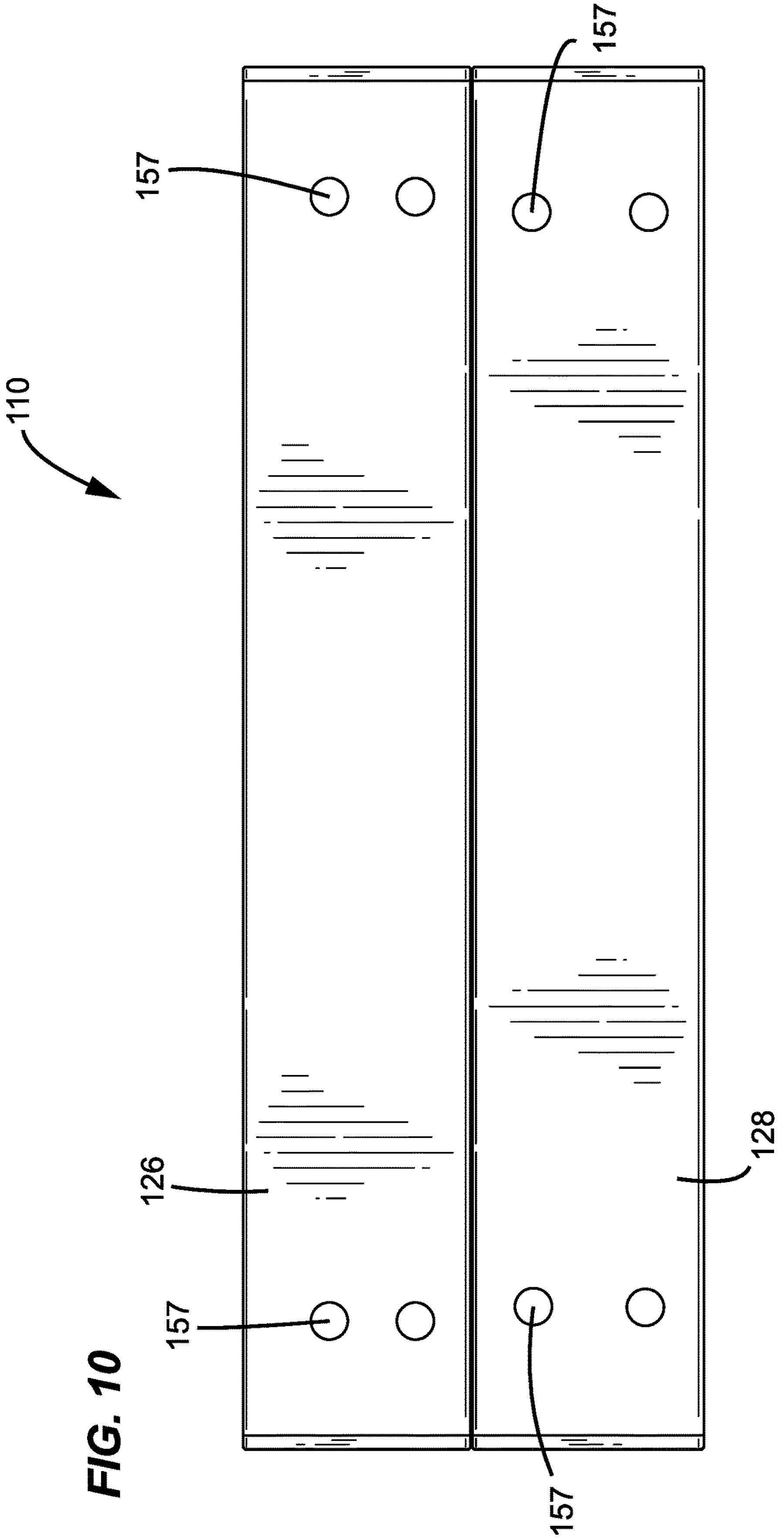
FIG. 10 is a rear view of the manifold of FIG. 9.

FIG. 10 shows a rear view of the manifold 110. In the depicted example, the manifold 110 include mounting apertures 157 that are configured to aid in mounting the manifold 110 to a surface, such as a wall. In some examples, the mounting apertures 157 are used to mount the manifold via a bracket to a surface (e.g., on a wall, pipe, or other solid surface).

Figure 12:
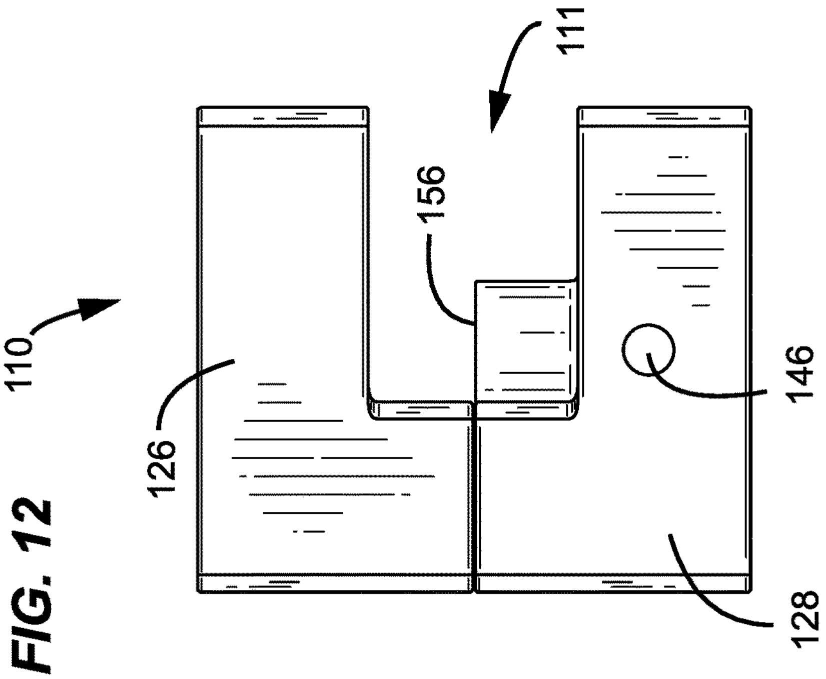
FIG. 12 is a second side view of the manifold of FIG. 9.
Figure 11:
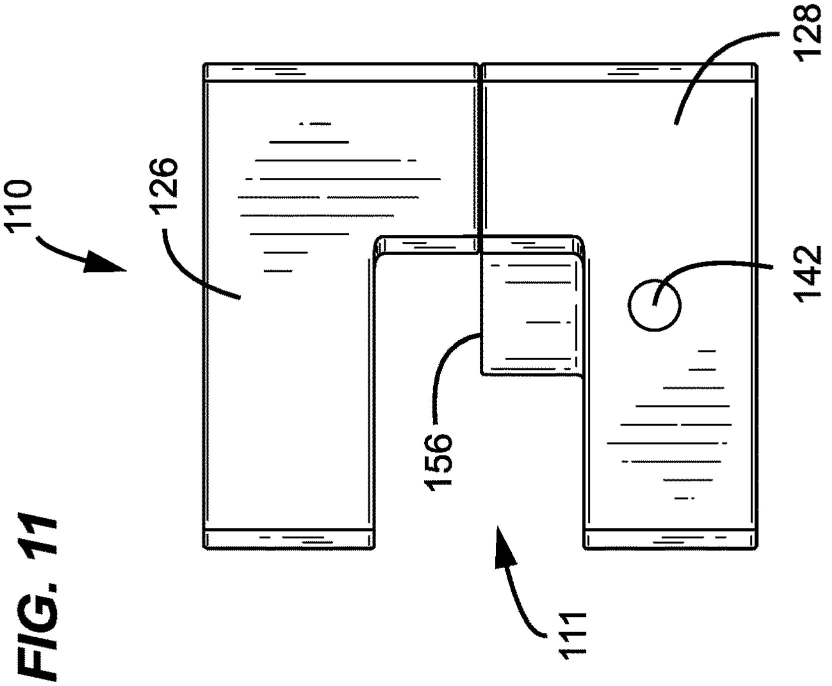
FIG. 11 is a first side view of the manifold of FIG. 9.

FIGS. 11 and 12 show side views of the manifold 110. As shown in FIG. 10, the second portion 128 includes the dispensing outlet 142 at a first side and, as shown in FIG. 11, includes the pressure outlet 146 at a second side. The manifold 110 is also shown to include a valve support surface 156 within the recess 111. The valve support surface 156 is configured to aid in supporting the valves 136*a*, 136*b*, 136*c*.

Figure 13:
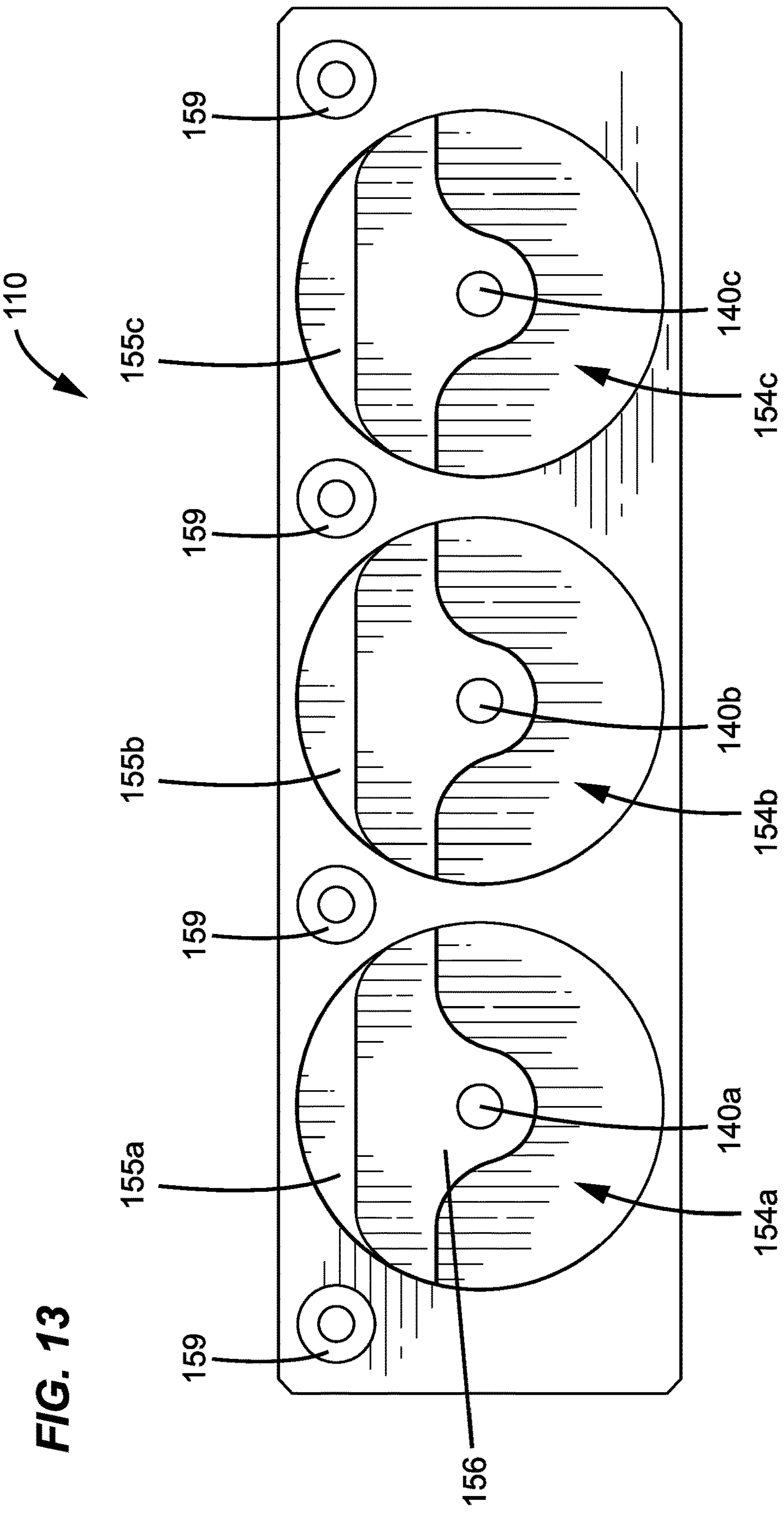
FIG. 13 is a top view of the manifold of FIG. 9.

FIG. 13 shows a top view of the manifold 110. As shown, the fire-extinguishing container receptacles 154*a*, 154*b*, 154*c* are aligned with the valve support surface 156. The valve support surface 156 also includes access to the auxiliary fluid passages 140*a*, 140*b*, 140*c*. In the depicted examples, the valves can be attached to the auxiliary fluid passages 140*a*, 140*b*, 140*c* and protrude upward toward the first portion 126.

Further, the manifold includes container support surfaces 155*a*, 155*b*, 155*c* in each fire-extinguishing container receptacle 154*a*, 154*b*, 154*c* to vertically support the fire-extinguishing agent containers 112*a*, 112*b*, 112*c*. In some examples, the fire-extinguishing container receptacles 154*a*, 154*b*, 154*c* can be adjustable so that they can tighten around the fire-extinguishing agent containers 112*a*, 112*b*, 112*c*. In such an example, a container support surface does not need to be used, but it can be.

In some examples, because the fire-extinguishing agent containers 112*a*, 112*b*, 112*c* utilize a recessed bottom surface and the valves 136*a*, 136*b*, 136*c* protrude into the recessed bottom, as shown in FIG. 7, the bottom rims 149*a*, 149*b*, 149*c* of the fire-extinguishing agent containers 112*a*, 112*b*, 112*c* still contact the container support surfaces 155*a*, 155*b*, 155*c* even when the valves 136*a*, 136*b*, 136*c* are mated with the fire-extinguishing agent containers 112*a*, 112*b*, 112*c*. In some examples, the container support surfaces 155*a*, 155*b*, 155*c* only support a portion of the fire-extinguishing agent containers 112*a*, 112*b*, 112*c*, such as by a portion of the bottom rims 149*a*, 149*b*, 149*c*. In some examples, the container support surfaces 155*a*, 155*b*, 155*c* support the entire fire-extinguishing agent containers 112*a*, 112*b*, 112*c*, such as by the complete bottom rims 149*a*, 149*b*, 149*c*.

Figure 14:
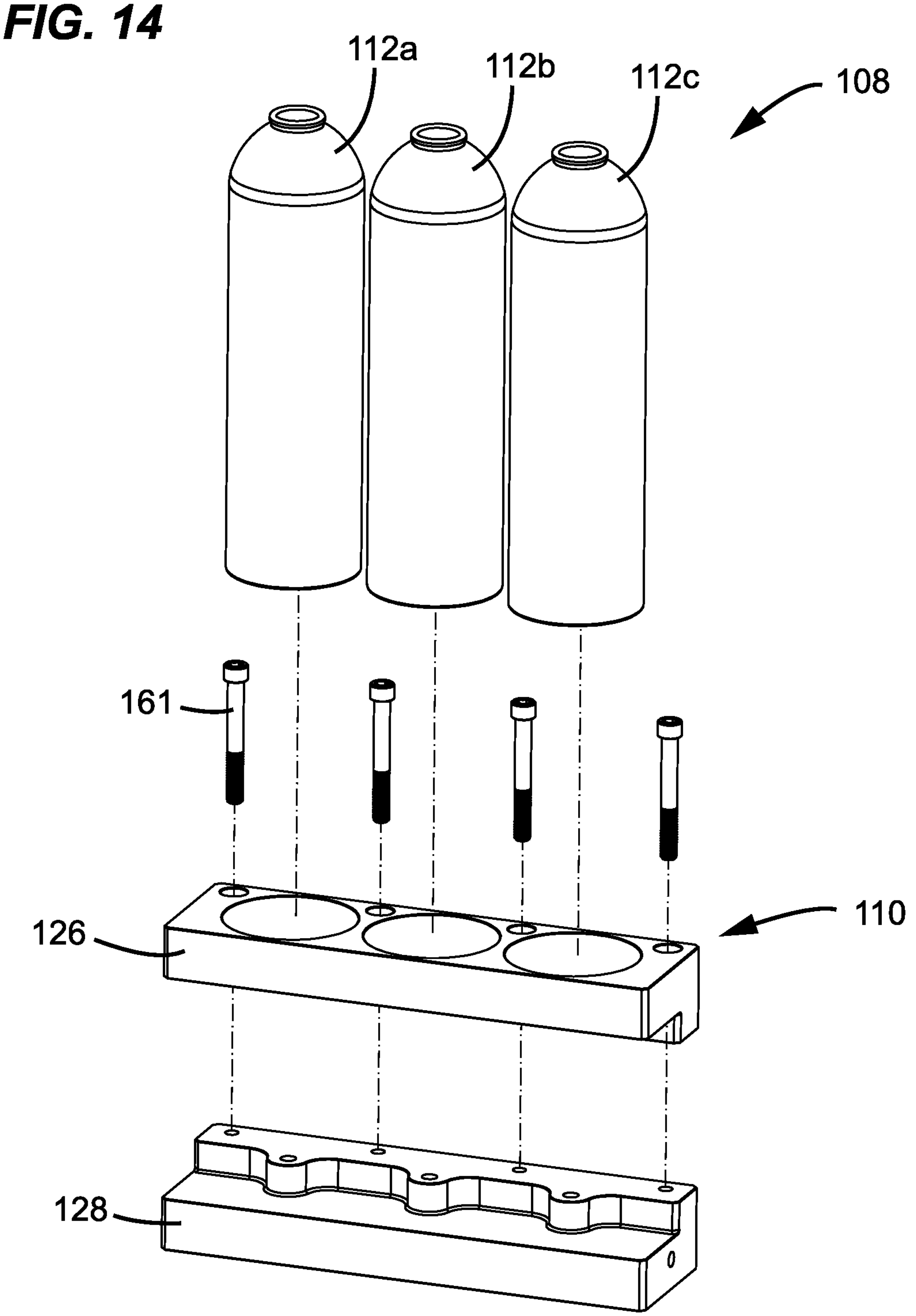
FIG. 14 is a perspective exploded view of the fire-extinguishing apparatus of FIG. 3.

FIG. 14 shows an exploded view of the fire-extinguishing apparatus 108. Fasteners 161 are used to connect the first and second portions 126, 128 together. Other forms of fastening can be used, such as welds, adhesive, etc.

Figure 15:
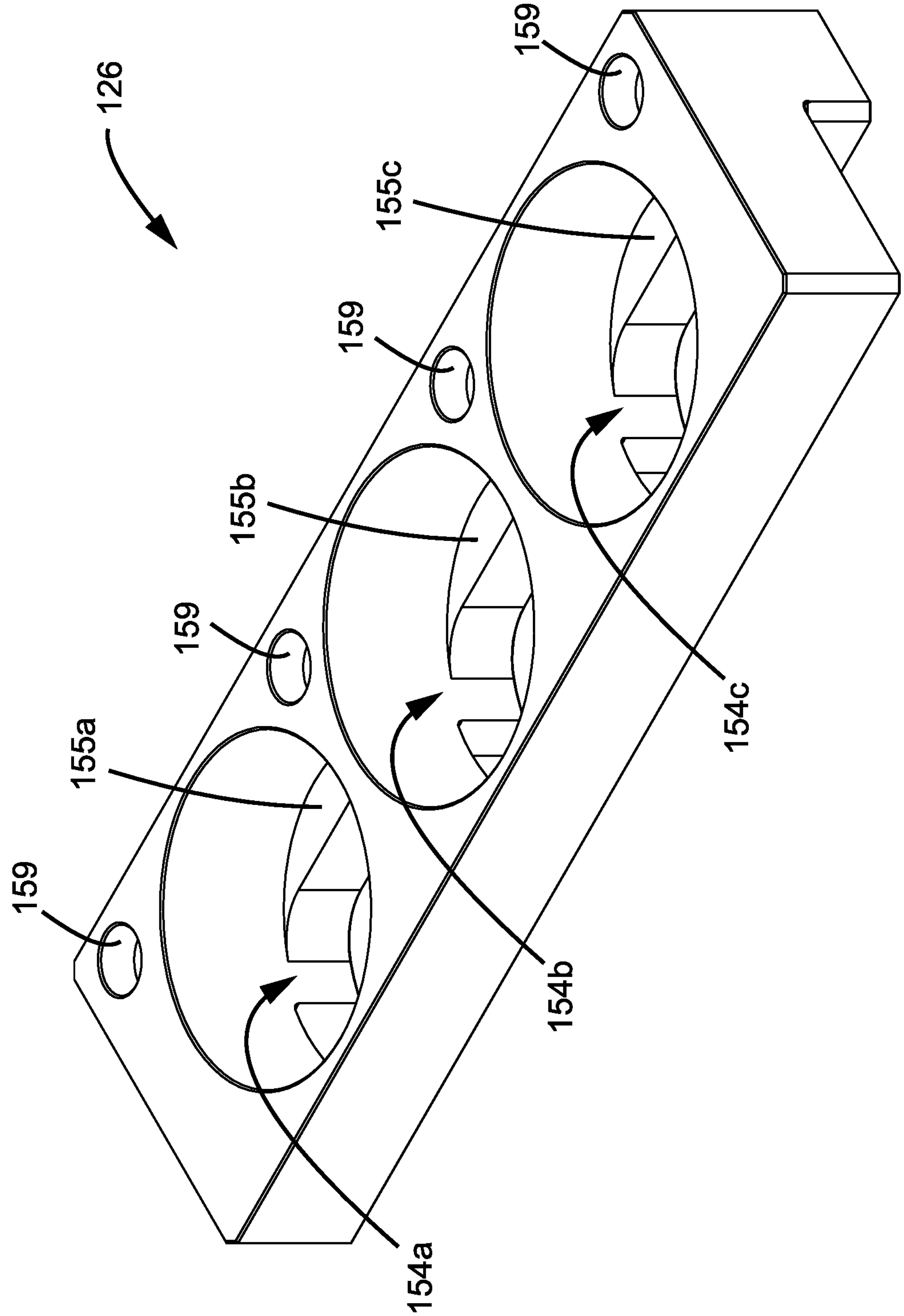
FIG. 15 is a perspective view of a first portion of the manifold of the fire-extinguishing apparatus of FIG. 3.

FIG. 15 shows a perspective view of the first portion 126 of the manifold 110. As shown, each container support surface 155*a*, 155*b*, 155*c* protrudes partially across the fire-extinguishing container receptacles 154*a*, 154*b*, 154*c*. As shown, the fire-extinguishing container receptacles 154*a*, 154*b*, 154*c* are partially open at a bottom side. In some examples, the fire-extinguishing container receptacles 154*a*, 154*b*, 154*c* are closed at a bottom side.

Figure 16:
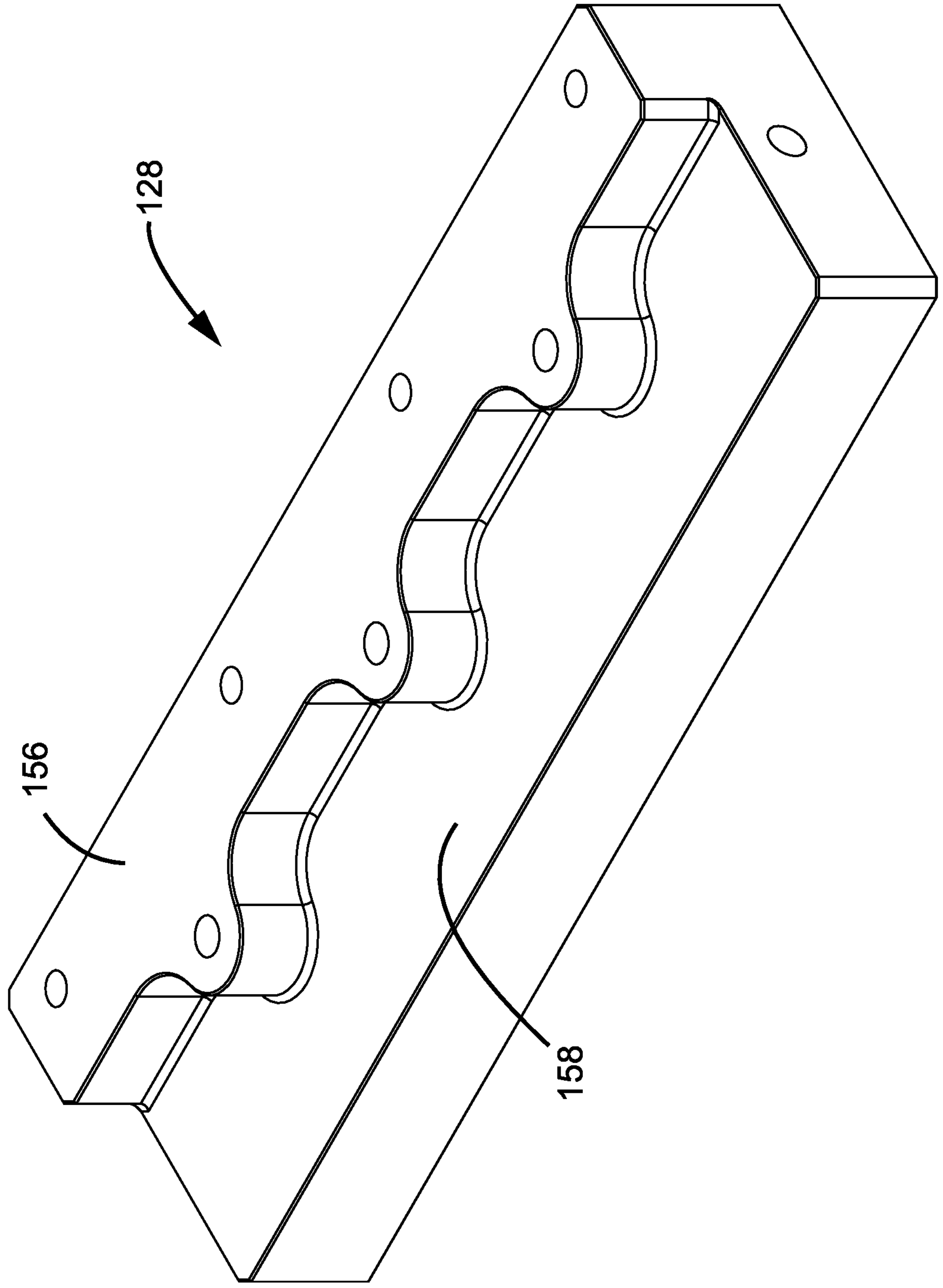
FIG. 16 is a perspective view of a second portion of the manifold of the fire-extinguishing apparatus of FIG. 3.

FIG. 16 shows a perspective view of the second portion 128 of the manifold 110. As shown, the valve support surface 156 extends from a recess bottom surface 158. Because of this, the recess 111 is formed and access to the valves 136*a*, 136*b*, 136*c* via the recess 111 is created.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A manifold for a fire-extinguishing apparatus comprising:
- a main body;
- a plurality of fire-extinguishing container receptacles defined in the main body of the manifold, each of the plurality of fire-extinguishing container receptacles being configured to receive a fire-extinguishing agent container and to surround and support an exterior of the fire-extinguishing agent container;
- a plurality of valves in communication with the plurality of fire-extinguishing container receptacles, the plurality of valves each being connected to an auxiliary fluid passage;
- a main fluid passage defined in the main body, the main fluid passage being connected to each auxiliary fluid passage;
- a dispensing outlet at an end of the main fluid passage, the dispensing outlet being configured to be fluidically coupled with a dispensing mechanism; and a recess arranged between a portion of the main body that defines the plurality of fire-extinguishing container receptacles and another portion of the main body that defines the main fluid passage, the recess providing access to the plurality of valves when the manifold is in an assembled configuration; and wherein the portion of the main body that defines the plurality of fire-extinguishing container receptacles is directly connected to the portion of the main body that defines the main fluid passage.

2. The manifold of claim 1, wherein the each of the plurality of fire-extinguishing container receptacles includes a fire-extinguishing agent container support configured to support a fire-extinguishing agent container within the each of the plurality of fire-extinguishing container receptacles.

3. The manifold of claim 1, further comprising a pressure outlet at a second end of the main fluid passage, the pressure outlet being configured for connection with a pressure valve.

4. The manifold of claim 1, further comprising a plurality of fire-extinguishing agent containers, each being positioned within the plurality of fire-extinguishing container receptacles.

5. The manifold of claim 1, wherein the portion of the main body that defines the plurality of fire-extinguishing receptacles is attached to the portion of the main body that defines the main fluid passage using fasteners.

6. The manifold of claim 1, wherein the portion of the main body that defines the plurality of fire-extinguishing container receptacles and the portion of the main body that defines the main fluid passage form a monolithic unitary body.

7. The manifold of claim 1, wherein the plurality of fire-extinguishing container receptacles are defined in a top side of the main body of the manifold, and wherein the recess is open and accessible from a front side of the main body of the manifold.

8. A manifold for a fire-extinguishing agent comprising:

a first portion of a main body, the first portion including:

a plurality of fire-extinguishing container receptacles defined in the first portion of the main body of the manifold, each of the plurality of fire-extinguishing container receptacles being configured to receive a fire extinguishing agent container and to surround and support an exterior of the fire extinguishing agent container;

a second portion of the main body, the second portion including:

a plurality of valves each being configured to mate with a respective fire-extinguishing agent container positioned in each of the plurality of fire-extinguishing container receptacles;

a main fluid passage, the main fluid passage being connected to each valve via an auxiliary fluid passage defined at least partially in the second portion;

a first outlet at a first end of the main fluid passage, the first outlet being configured to be fluidically coupled with a dispensing mechanism; and a second outlet at a second end of the main fluid passage, the second outlet being configured for connection with a pressure valve; and a recess arranged between the first portion of the main body and the second portion of the main body, the recess providing access to the plurality of valves when the manifold is in an assembled configuration;

wherein the first portion of the main body and the second portion of the main body are directly connected to one another.

9. The manifold of claim 8, wherein the first portion of the main body and the second portion of the main body are attached to one another using fasteners.

10. The manifold of claim 8, wherein the first portion of the main body and the second portion of the main body form a monolithic unitary body.

11. The manifold of claim 8, wherein each of the plurality of fire-extinguishing container receptacles is open on a top side and a bottom side.

12. The manifold of claim 8, wherein each of the plurality of fire-extinguishing container receptacles includes a fire extinguishing agent container support configured to support a respective fire extinguishing agent container within the each of the plurality of fire-extinguishing container receptacles.

13. The manifold of claim 8, further comprising a plurality of fire-extinguishing agent containers, each being positioned within the plurality of fire-extinguishing container receptacles.

14. The manifold of claim 8, wherein the plurality of fire-extinguishing container receptacles are defined in a top side of the main body of the manifold, and wherein the recess is open and accessible from a front side of the main body of the manifold.

15. A fire-extinguishing system comprising:

a plurality of fire-extinguishing agent containers positioned within a plurality of fire-extinguishing container receptacles defined in a main body of a manifold;

the fire-extinguishing container receptacles each being configured to receive a fire-extinguishing agent container and to surround and support an exterior of the fire-extinguishing agent container, the fire-extinguishing container receptacles comprising:

a plurality of valves each being connected to one of the plurality of fire-extinguishing agent containers and the main body, the plurality of valves being in communication with the plurality of fire-extinguishing agent containers, the plurality of valves each being connected to an auxiliary fluid passage;

a main fluid passage defined in the main body, the main fluid passage being fluidically coupled to each valve, the main fluid passage being connected to each auxiliary fluid passage;

a dispensing outlet at a first end of the main fluid passage, the dispensing outlet being configured to be mated with and fluidically coupled with a dispensing mechanism; and a recess arranged between a portion of the main body that defines the plurality of fire-extinguishing container receptacles and another portion of the main body that defines the main fluid passage, the recess providing access to the plurality of valves when the manifold is in an assembled configuration; and wherein the portion of the main body that defines the plurality of fire-extinguishing container receptacles is directly connected to the portion of the main body that defines the main fluid passage.

16. The system of claim 15, wherein each of the plurality of fire-extinguishing container receptacles is configured to receive one of the plurality of fire-extinguishing agent containers.

17. The system of claim 16, further comprising a pressure outlet at a second end of the main fluid passage, the dispensing outlet being configured for connection with a control valve and the pressure outlet being configured for connection with a pressure valve.

18. The system of claim 16, wherein each of the plurality of fire-extinguishing container receptacles includes a fire-extinguishing agent container support configured to support a respective fire-extinguishing agent container within the each of the plurality of fire-extinguishing container receptacles.

19. The system of claim 15, wherein the auxiliary fluid passage is defined in the main body.

20. The system of claim 15, wherein a dispensing conduit is connected to the dispensing outlet.

21. The system of claim 15, further comprising a detection mechanism being positioned remote from the plurality of fire-extinguishing agent containers, the detection mechanism being configured to detect the presence of a fire, and a control valve in connection with the dispensing outlet to automatically open and discharge the fire-extinguishing agent from the plurality of fire-extinguishing agent containers via the main fluid passage and dispensing outlet upon the detection of the presence of a fire by the detection mechanism.

22. The system of claim 15, wherein each of plurality of valves is connected to a port positioned in a bottom of each of the plurality of fire-extinguishing agent containers.

23. The system of claim 22, wherein each port is recessed into the bottom of each of the plurality of fire-extinguishing agent containers.

24. The system of claim 15, further comprising a control valve in connection with the dispensing outlet to automatically open and discharge the fire-extinguishing agent from the plurality of fire-extinguishing agent containers via the main fluid passage and dispensing outlet upon the detection of the presence of a fire by a detection mechanism.

25. The system of claim 15, further comprising a control valve in connection with the dispensing outlet to manually open and discharge the fire-extinguishing agent from the plurality of fire-extinguishing agent containers via the main fluid passage and dispensing outlet.

26. The system of claim 15, wherein the fire-extinguishing agent containers are aerosol containers.

27. The manifold of claim 15, wherein the plurality of fire-extinguishing container receptacles are defined in a top side of the main body of the manifold, and wherein the recess is open and accessible from a front side of the main body of the manifold.

* * * * *